(12) United States Patent
Sundaram (10) Patent No.: US 10,756,824 B2
(45) Date of Patent: Aug. 25, 2020

(54) FREE AIR OPTICAL BACKPLANE INTERCONNECT

(71) Applicant: Intel Corporation, Santa Clara, CA (US)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/329,694

(22) PCT Filed: Sep. 29, 2016

(86) PCT No.: PCT/US2016/054388
§ 371 (c)(1),
(2) Date: Feb. 28, 2019

(87) PCT Pub. No.: WO2018/063230
PCT Pub. Date: Apr. 5, 2018

(65) Prior Publication Data
US 2019/0199446 A1 Jun. 27, 2019

(51) Int. Cl.
*G02B 6/42* (2006.01)
*G02B 6/032* (2006.01)
(Continued)

(52) U.S. Cl.
CPC ......... *H04B 10/803* (2013.01); *G02B 6/4202* (2013.01); *G02B 6/4228* (2013.01);
(Continued)

(58) Field of Classification Search
CPC .................................................. H04B 10/803
See application file for complete search history.

(56) References Cited

U.S. PATENT DOCUMENTS 5,475,215 A 12/1995 Hsu
8,974,126 B2 * 3/2015 Sloey .................. G02B 6/3817
385/93
(Continued)

FOREIGN PATENT DOCUMENTS

WO  WO-2018063230 A1  4/2018

OTHER PUBLICATIONS

"International Application Serial No. PCT/US2016/054388, International Search Report dated May 23, 2018", 3 pgs.
(Continued)

*Primary Examiner* — Sung H Pak
(74) *Attorney, Agent, or Firm* — Schwegman Lundberg & Woessner, P.A.

(57) ABSTRACT

A system includes a first free-air optical interconnect of a first electrical component, the first free-air optical interconnect configured to mechanically couple to a second free-air optical interconnect of a second electrical component to communicate optical signals between the first and second electrical components. When coupled, an attach mechanism of the first free-air optical interconnect can retain the second free-air optical interconnect a fixed distance from the communication interface of the first free-air communication interface, including separate electrical connectors configured to communicate power and ground using electrical conductors, the communication interface includes a free-air optical interconnect including at least one of a laser emitter configured to transmit laser energy across an air gap to a separate device, or a photodiode configured to detect laser energy received across the air gap from the separate device.

20 Claims, 5 Drawing Sheets

(51) Int. Cl.
H04B 10/80 (2013.01)
H04B 10/114 (2013.01)
H04B 10/43 (2013.01)
G02B 6/02 (2006.01)

(52) U.S. Cl.
CPC ......... G02B 6/4246 (2013.01); G02B 6/4284 (2013.01); H04B 10/1143 (2013.01); H04B 10/43 (2013.01); H04B 10/808 (2013.01); *G02B 6/02328* (2013.01); *G02B 6/032* (2013.01)

(56) References Cited

U.S. PATENT DOCUMENTS

| | | | |
|---|---|---|---|
| 9,791,634 B2* | 10/2017 | DiFonzo | G02B 6/3886 |
| 2005/0036789 A1 | 2/2005 | Bjorndahl et al. | |
| 2006/0051981 A1* | 3/2006 | Neidlein | H01R 13/6205 |
| | | | 439/39 |
| 2013/0087690 A1* | 4/2013 | Sloey | G02B 6/3817 |
| | | | 250/216 |
| 2014/0050491 A1 | 2/2014 | Ko et al. | |
| 2016/0124165 A1 | 5/2016 | Luo et al. | |

OTHER PUBLICATIONS

"International Application Serial No. PCT/US2016/054388, Written Opinion dated May 23, 2018", 9 pgs.

"International Application Serial No. PCT US2016 054388, International Preliminary Report on Patentability dated Apr. 11, 2019", 11 pgs.

* cited by examiner

FIG. 9

FREE AIR OPTICAL BACKPLANE INTERCONNECT

PRIORITY APPLICATION

This application is a U.S. National Stage Filing under 35 U.S.C. 371 from International Application No. PCT/US2016/054388, filed on Sep. 29, 2016, and published as WO 2018/063230, which application is incorporated herein by reference in its entirety.

TECHNICAL FIELD

Embodiments pertain to high-speed interconnections in electronic systems, and more specifically to free-air optical backplane interconnect.

BACKGROUND

Electronic systems often include electronic devices that communicate signals among each other. Designers of electronic systems strive to increase the speed of the communication among devices while keeping the communication link robust. Wireless connections can be more robust than wired connections because of the elimination of the need for mechanical contact for communication that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber optic cables, which can be more expensive than wired interfaces, and can require air tight glass-to-glass connections to prevent Fresnel reflections, making them less desirable and, in certain examples, impractical for day-to-day free-air interconnects. There is a general need for high-speed, low-cost, more robust devices, systems, and methods for high-speed interconnections among electronic devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

With increasing circuit speeds and decreasing board sizes, the physical limit for routing parallel high-speed copper interconnects is approaching. A faster alternative is desired to transport high-speed signals, such as within the board or otherwise within a system. With reducing rise times and longer trace lengths, it is also desired that the interconnect be robust and have high noise immunity. Power and cost, as well as ease of use, are also desired.

As such, it is desirable to implement a wireless communication interface that can provide improved data rate and can adapt basic wireless interconnection with existing protocols (e.g., universal serial bus (USB), mobile industry processor interface (MIPI), peripheral component interconnect (PCI), PCI express (PCIe), high definition multimedia interface (HDMI), Thunderbolt (TBT), display port (DP), or other serial busses and serial-parallel busses used in consumer electronics, enterprise class devices, wearable electronic devices, portable computers, or tablet computers), yet not be tied to any one specific protocol. An infrared-based (IR-based) interface is an alternative to an RF interface, but an IR-based interface involves conversion between protocols, which adds overhead to the communication. A laser-based optical interface requiring a fiber-optic cable or interconnect can meet these requirements for the interconnection, but the cost of fiber-optic based optical interconnections, as well as the high power and strict connection requirements for high noise immunity, can be prohibitive.

A laser-based optical communication interface, such as a light amplitude modulation docking adapter (LAMDA), does not require fiber optics to transmit and receive the laser emitted signals, but instead can transmit an optical signals via free air space. This can be accomplished by communicating the optical signals over short distances (e.g., about ten millimeters, or 10 mm) so that signal loss is tolerable. The free air optical interface can scale to data rates up to ten gigabits per second (10 Gbps) (20 Gbps duplex communication, e.g., for USB 3.1 and above), and rates of one terabit per second (1 Tbps) or more may be available. This type of optical interface is not tied to any specific protocol and eliminates protocol overhead, which reduces the latency in communication to near zero latency. Further, the optical interface is agnostic to clock rate, making the interface compatible with high-speed and low-speed interfaces.

Optical communication interfaces, such as LAMDA, must have sufficient line of sight alignment between transmitter (TX) and receiver (RX) sections of master and slave devices, host and coupled devices, etc. For example, alignment accuracy of +/−0.75 mm may be required for a speed of 10 Gbps per lane at a separation distance of 5 mm for laser power not exceeding 30 mW at a frequency of 860 nm. An angular misalignment up to 3 degrees would be exceptional for a 20 Gbps full-duplex communication link. In other examples, for communication over longer distances, or where a direct line-of-sight is impossible, a hollow-core or air-core fiber (e.g., a photonic bandgap or other hollow or air-core fiber, etc.) can be used.

The present inventor has recognized, among other things, possible interconnects for such free-air optical communication, as well as interconnects between fiber connections, such as hollow-core fiber bandgap fiber. The LAMDA interface disclosed herein can extend existing consumer and enterprise grade attach mechanisms to optical communication, in certain examples, without the strict attach mechanisms of fiber core communication, and without glass-glass mating requirements, requiring only sufficient line of sight alignment and gap adherence (e.g., 10 mm, etc.), such that complex mechanisms are not required. The LAMDA interface can be advantageous if, among other things, a direct line-of-sight is available, and speed, cost, or other conditions make copper wire routing difficult or costly (e.g., across hinges, short distances (e.g., board-to-board, or other high copper-routing complexity), connector space, confined space, high use, etc.). In other examples, such as when a direct line-of-sight is not available, or if the transmission distance is greater than a threshold distance (e.g., 10 mm, or one or more other distances, depending on the desired power level of the free-air optical communication, etc.), a hollow or air-core medium (e.g., fiber, tube, channel, etc.) can be used, for example, within or in combination with a standard connector (e.g., USB, etc.), and the laser emitter, photodiode, and trans-impedance amplifier disclosed herein.

From a user perspective, the learning curve is insignificant, as the interconnects disclosed herein look and behave the same as existing, common connectors, with the advantage of high-speed free-space optical interconnection. From a manufacturing perspective, a clean room environment is not required for production of such interfaces. Further, laser product level Class 1 certification is also easily achievable, as the small free-air interconnects disclosed herein (e.g., 0.8 mm×0.6 mm×0.2 mm, etc.) can be embedded deep inside a connector, and can be suitable for any size, even wearable, devices.

Figure 1:
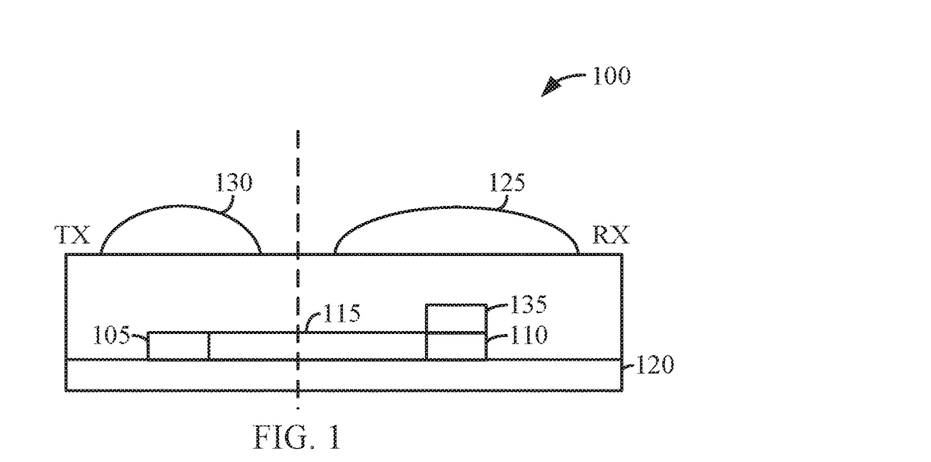
FIG. 1 is an illustration of an optical transmitter (TX) receiver (RX) pair in accordance with some embodiments.

Enterprise class servers are high-end, performance-oriented systems with high system availability. Enterprise systems typically include rack systems with interchangeable line cards. To connect line cards to a backplane connector, high-speed interconnects are used. Such interconnects, however, can be prone to failure due to wear and tear, or improper alignment, prompting customer returns. The present inventor has recognized that a traditional backplane connector can be replaced with a combination of a free-air high-speed optical interconnect FIG. 1 is an illustration of an embodiment of an optical communication interface including an optical transmitter (TX) receiver (RX) pair 100. The optical TX/RX pair 100 can include a laser emitter 105, such as a laser diode or a vertical-cavity surface emitting laser (VCSEL) for example. The optical receiver can include a photodiode (PD) 110 to convert received laser energy into an electrical signal. When laser light falls on the photodiode 110, it produces a photo diode current. The current produced is proportional to the amount of laser light incident on the photodiode 110. When the laser light is modulated, the photodiode current varies with the intensity of the incident laser light.

A trans-impedance amplifier 115 (TIA) can be used to amplify the electrical signals generated by the photodiode 110. In some examples, the TIA provides an average of the photodiode current generated by the photodiode 110. The laser emitter 105, the photodiode 110 and the TIA 115 are arranged on a substrate 120. Some examples of the substrate 120 include a printed circuit board (PCB) made of plastic, plastic laminate (E.g., FR4) or ceramic.

To form a serial duplex optical interface, a second optical TX/RX pair can be positioned opposite the optical TX/RX pair 100 in FIG. 1 (e.g., a first optical TX/RX pair). The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the first and second optical TX/RX pairs is small (e.g., about 2.5 mm). The small separation allows for the receivers to reliably detect the laser energy from the laser emitters. Each TX/RX pair can include a lens 125 to focus incident laser energy onto the photodiode 110. Each TX/RX pair may also include a second lens 130 to focus the emitted laser energy toward the receiving photodiode across the air gap. The lenses 125, 130 may be epoxy molded lenses.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS). In some embodiments, the laser bandpass filter 135 is formed as a coating on the lens 125.

The laser bandpass filter 135 of a TX/RX pair has a passband that excludes the center frequency of the laser energy emitted by the laser emitter 105 of the TX/RX pair, but the passband includes the center frequency of the laser energy emitted by the laser emitter of the communication lane of the photodiode 110. Thus, the laser bandpass filter 135 reduces or eliminates laser energy from one communication lane from being detected by the other communication lane. In some embodiments, the center frequency of a laser emitter is assigned based on whether the laser emitter is included in a host device (e.g., a computing device or a mobile communication device) or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device.

Figure 2:
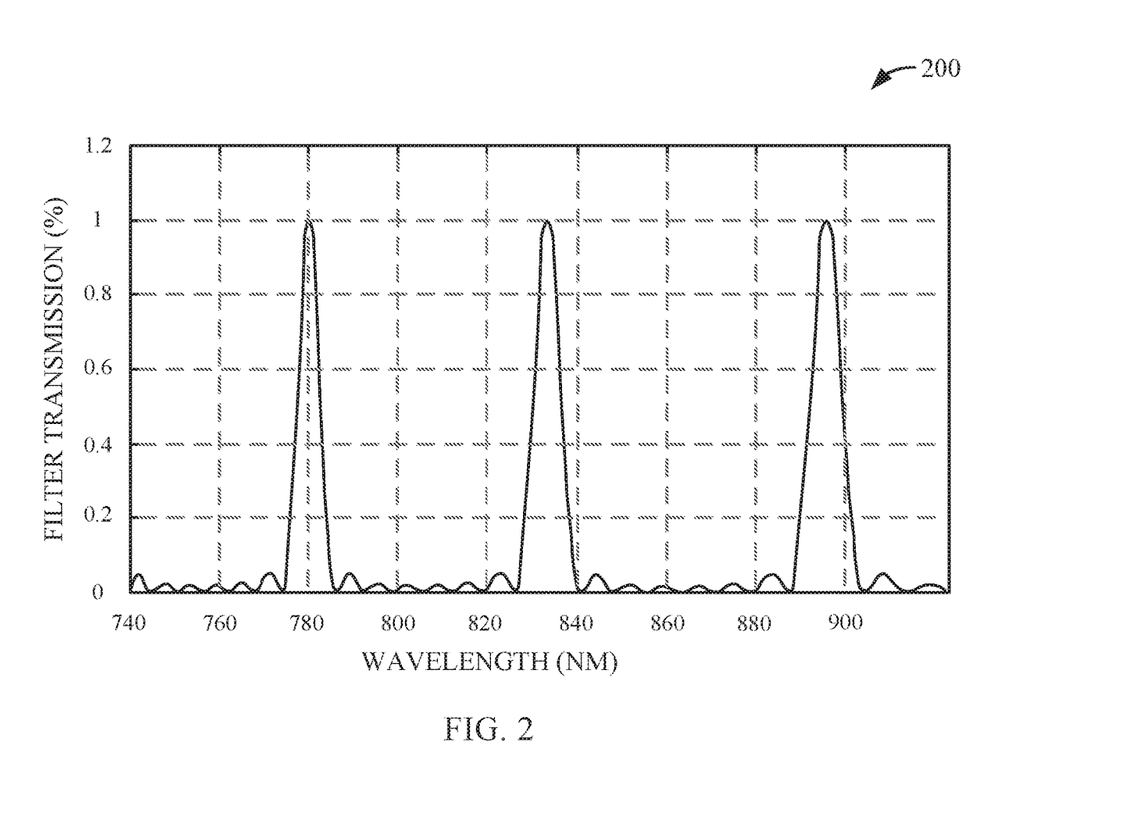
FIG. 2 is an illustration of a filter characteristic for a laser bandpass filter in accordance with some embodiments.

FIG. 2 is an illustration of a filter characteristic for a laser bandpass filter 200. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of 830 nm. FIG. 2 shows an example of a filter characteristic for the host device. The filter shows very high attenuation at 855 nm and shows that the passband of the filter includes 830 nm.

Figure 3:
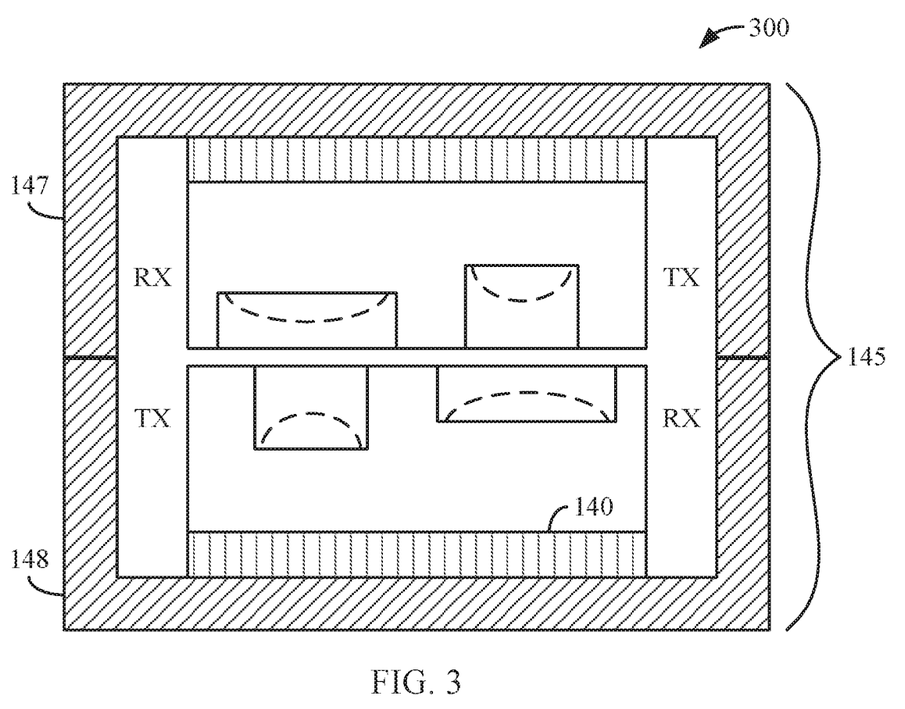
FIG. 3 is an illustration of an arrangement of optical TX/RX pairs in accordance with some embodiments.

FIG. 3 is an illustration of two optical TX/RX pairs arranged to form a duplex serial optical interface 300, including a mechanical connector 145 to house the interface and protect against interference from outside sources. The mechanical connector 145 may include first connector body portion 147 housing a first optical TX/RX pair (such as that illustrated in FIG. 1), and a second connector body portion 148 housing a second optical TX/RX pair, positioned opposite the first optical TX/RX pair to create a first and second communication lanes in reverse directions.

The first and second connector body portions 147, 148 can be coupled using one or more attach mechanisms. For example, the attach mechanism can include an adhesion-based attach mechanism (e.g., tape, glue, or one or more other adhesion-based mechanisms), a magnetic attach mechanism (e.g., permanent or fixed magnets, etc.), an electro-static attach mechanism, a mechanical attach mechanism, or a chemical attach mechanism, etc.

An air gap separates the two TX/RX pairs. The separation between the two optical TX/RX pairs is small (e.g., about 2.5 mm). The small separation allows for the optical receivers to reliably detect the laser energy from the laser emitters. The optical TX/RX pairs also include lenses. Portions of the lenses may have different curvature. The first lens portion may focus laser energy received across the air gap from a laser emitter onto a photodiode, and the second lens portion may focus laser energy from a laser emitter transmitted across the air gap toward a photodiode.

An optical TX/RX pair may be electrically connected to logic circuitry 140. The logic circuitry 140 transmits and receives signals communicated according to a duplex communication protocol, such as a USB protocol. In certain embodiments, the logic circuitry 140 may be arranged on one or both of the substrates. In some variations, one or both of the substrates are electronics package substrates and the laser emitters, the photodiodes, and the logic circuitry may be included in the same electronics package.

The center frequency of a laser emitter may be assigned based on the type of device. For example, the optical TX/RX pair of the second connector body portion 148 may be included in a host device, and the optical TX/RX pair of the first connector body portion 147 may be included in a peripheral device (e.g., a disc drive). The laser emitter of the host device TX/RX pair may emit laser energy at a first center frequency and may include a laser bandpass filter that excludes the first center frequency. The laser emitter of the peripheral device TX/RX pair may emit laser energy at a second center frequency and may have a laser bandpass filter that excludes the second center frequency and passes the first center frequency. The laser bandpass filter of the host device TX/RX pair passes the second center frequency. Therefore, the passband of the laser bandpass filter may be selected according to the type of device in which the TX/RX pair is included.

In certain embodiments, the substrate is an electronics package substrate and a laser emitter, a photodiode, and the logic circuitry 140 may be included in the same electronics package. Data is sent between devices or between optical links of the optical interface by transmitting laser energy via free air. It is desirable to keep the laser power low and also to prevent the laser emitters from firing into free air without any mechanical protective cover. This prevents the optical interface from exceeding class 1 laser certification. For consumer class devices, it is desirable for safety reasons to keep the laser emitters off until the two connector portions are joined and the two links of the optical interconnection are completely covered without laser light leaking or reflecting out from any side of the connector.

Figure 4:
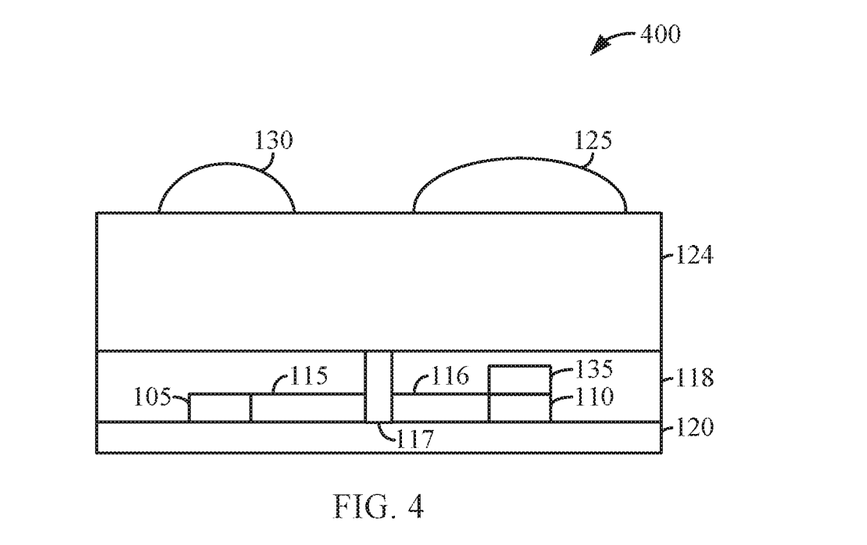
FIG. 4 is an illustration of an optical transmitter (TX) receiver (RX) pair in accordance with some embodiments.

FIG. 4 is an illustration of an optical transmitter (TX) receiver (RX) pair 400. The optical TX/RX pair can include a laser emitter 105, such as a laser diode or a vertical-cavity surface emitting laser (VCSEL) for example. The optical receiver can include a photodiode 110 to convert received laser energy into an electrical signal. A trans-impedance amplifier 116 (TIA) can be used to amplify the electrical signal generated by the photodiode 110. A drive amplifier 115 may also be included to translate signals to be transmitted to levels of power or voltage needed to drive the laser emitter 105. The laser emitter 105 and the photodiode 110 are arranged on a substrate 120. Some examples of the substrate 120 include a printed circuit board (PCB) made of plastic, a plastic laminate (e.g., FR4), or ceramic.

A resin 118 may be disposed on the substrate to encapsulate the electronics. The resin may be an optically clear resin (OCR) that flows before hardening. However, OCR may be susceptible to scratching. Because the optical interface is exposed to air rather than being protected using connections to fiber-optics, the optical TX/RX pair may need a surface with a higher degree of hardness than a resin can provide.

The optical TX/RX pair can include a lens 124. The lens may have a surface hardness rating of 8H or higher. The lens 124 can include a first lens portion 125 having a first curvature arranged above the photodiode 110 and a second lens portion 130 having a second curvature arranged above the laser emitter 105. The lens may be pre-formed prior to assembly and may include alumina silicate glass or a co-polymer coated poly (methyl methacrylate) (PMMA), such as sol-gel coated PMMA for example. The lens may have the same refractive index as the OCR to prevent reflections at the OCR/lens interface. The lens may also provide protection from humidity. An isolation barrier 117 may be arranged on the substrate between the laser emitter and the photodiode. The isolation barrier 117 may extend from the substrate to the top surface of the resin and may also serve as a support for the lens during curing of the resin.

It may be desirable to use a photodiode 110 that has a wide spectral response (e.g., an indium gallium arsenide (InGaAs) photodiode). The wide spectral response is desirable for detection of laser energy transmitted over air, but can cause problems of crosstalk between communication lanes, such as the two communication lanes of FIG. 3. To reduce or eliminate crosstalk between communication lanes, a laser bandpass filter 135 is arranged above the photodiode 110 of each TX/RX pair. In some embodiments, the laser bandpass filter can be a Lyot filter or a dichroic filter arranged above the photodiode. In some embodiments, the laser bandpass filter 135 is formed on a surface of the lens 124 that contacts the resin. The coating may be a thin film coating (e.g., an anti-reflective coating, or ARC) formed using ion beam sputtering (IBS) included on the surface of the lens contacting the resin.

The laser bandpass filter 135 of the TX/RX pair has a passband that excludes the center frequency of the laser energy emitted by the laser emitter of the same TX/RX pair, but the passband includes the center frequency of the laser energy emitted by the laser emitter opposite the photodiode in the communication lane of the photodiode. Thus, the laser bandpass filter 135 reduces or eliminates laser energy from one communication lane from being detected by the other communication lane.

Figure 5:
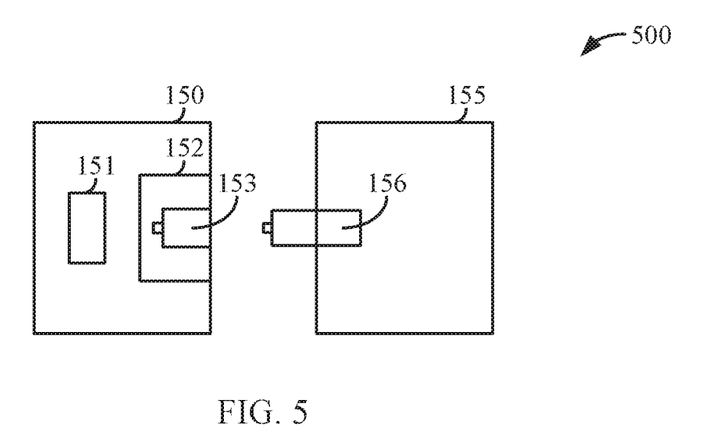
FIG. 5 is an illustration of a fiber optic backbone-server connection between a line card and a backplane in accordance with some embodiments.

FIG. 5 is an illustration of a fiber optic backbone-server connection 500 between a line card 150 and a backplane 155, including a fiber optic cable 156. The line card 150 can include a photodiode/laser diode 151 (e.g., including one or more of the photodiode 110, the laser emitter 105, or one or more other component described above, etc.), and a silicone gasket 152 including a cavity 153. The cavity 153 is configured to provide an air tight connection with between the fiber optic cable 156 and the silicone gasket 152, for example, to limit optical energy loss in the form of Fresnel reflections (e.g., refractive changes are reduced or completely eliminated).

To limit Fresnel reflections, and in certain examples, to increase the rate or accuracy of data transfer, a free-air optical interconnect (e.g., a LAMDA socket or connector) can be used on one or more of the line card 150, the backplane 155, or one or more other enterprise or server equipment. Such free-air optical interconnect can include one or more socket or connector having one or more alignment or self-alignment features, such as a self aligning magnetic rim connector with a photonic bandgap hollow-core fiber in the center, and can replace existing electrical interconnect (e.g., electrical signals transferred through a conductor, such as copper wire, etc.) or a traditional glass fiber core. In an example, the alignment features can include one or more physical protrusions configured to mate with a physical depression on a corresponding surface. In an example, the alignment features can be combined with one or more retainment features, such as the one or more attach mechanisms (e.g., magnetic, adhesive, mechanical, etc.) disclosed herein, the alignment features configured to provide proper orientation, placement, or alignment, and the attach mechanisms configured to retain the components once in position.

If certain examples, instead of a hollow-core fiber at the receiver side, a free-air optical interconnect can be placed on a backplane (e.g., a PC board (PCB) of a backplane), and then backplane signals can be transmitted using electrical signals, reducing wear and tear of traditional attach/detach or other mechanical wear and tear (e.g., lack of interference fit, no required direct electrical or optical contact (e.g., 10 mm range), etc.). In other examples, use of a hollow-core fiber can extend the range of a free-air optical interconnect, from tens of millimeters to hundreds of meters or more, as loss in an air-core fiber is less than a glass-core fiber.

Advantages of such free-air optical interconnect can include relaxed alignment requirements in contrast to existing fiber glass-glass or other interfaces, less mechanical wear, immunity from electrical noise or interference, the ability to stack hundreds of high-speed interconnect signals within a short distance or small area without interference, security from existing data attacks, etc. Further, in combination with a hollow-core fiber, connections can be made over a variety of distances, from millimeters to hundreds of meters or longer, with reduced loss (e.g., three or more times less loss than a convention cable, etc.).

Figure 6:
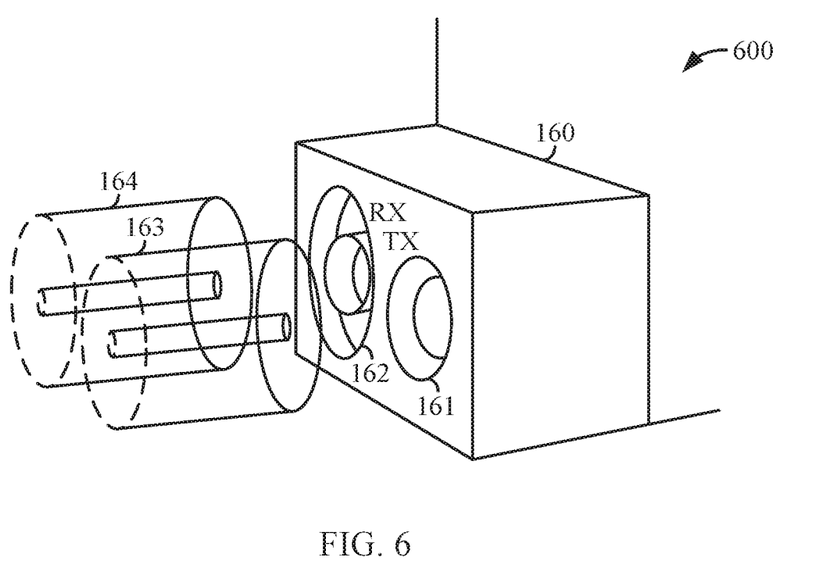
FIG. 6 is an illustration of a free-air fiber backbone interconnect, including a free-air interconnect having transmit (TX) and receive (RX) sockets configured to receive respective air-core fibers in accordance with some embodiments.

FIG. 6 is an illustration of a free-air fiber backbone interconnect 600, including a free-air interconnect 160 (e.g., a LAMDA socket connected to a line card or other enterprise equipment, etc.) having transmit (TX) and receive (RX) sockets 161, 162 configured to receive respective air-core fibers 163, 164. In an example, the free-air interconnect 160 can include an electrical communication interface configured to receive electrical signals from coupled equipment (e.g., traditional electrical signals from a line card, etc.), and an optical communication interface configured to provide optical signal output (e.g., a laser or other optical output) to respective air-core fibers 163, 164, or directly to another paired optical communication interface (e.g., another laser or other optical output, etc.), or vice versa. Free-air coupling reduces mechanical alignment issues associated with traditional electrical and glass-glass interfaces (e.g., air seal not required, different refractive index tolerance, etc.), and provides high power efficiency and data transfer rates with very low loss.

At the opposite side of the air-core fibers 163, 164 (not shown), a similar arrangement can couple light contained within, or provide an optical signal output to, one or more of the air-core fibers 163, 164, to enable communication between devices. With this arrangement, an entire backplane electrical interconnect can be converted to air-core fiber interconnects with no coupling or handing requirements. In certain examples, one or more coatings (e.g., ion-beam sputtering (IBS) coatings, etc.) can be used on receive-side photodiodes to ensure low cross talk and high channel isolation in communication-dense applications. In other examples, if the distance between equipment is short enough (e.g., tens of millimeters or less), two free-air interconnects can be positioned to communicate directly, without use of an air-core fiber, such as described above.

Figure 7:
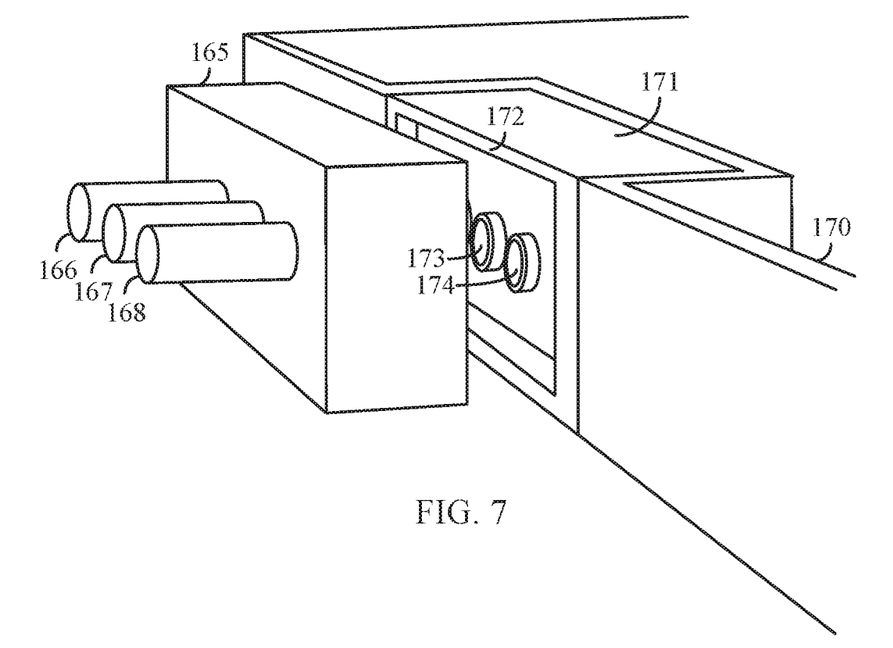
FIG. 7 is an illustration of a line card having a first free-air optical interconnect configured to receive a second free-air optical interconnect in accordance with some embodiments.

FIG. 7 is an illustration of a line card 170 having a first free-air optical interconnect 171 configured to receive a second free-air optical interconnect 165. The first free-air optical interconnect 171 can be mounted on the line card 170, or one or more other enterprise or server equipment, and can include first, second, and third interconnects 173, 174 (the first interconnect is not shown) for free-air coupling to respective interconnects of the second free-air optical interconnect 165, such as a backplane mounted receptacle including first, second, and third hollow-core fibers 166, 167, 168 configured to transmit optical signals to one or more other portions of the backplane or other equipment.

The first free-air optical interconnect 171 can include an attach mechanism, such as a magnet rim 172 for magnetic coupling to the second free-air optical interconnect 165. In other examples, the attach mechanism can include an interference-fit, snap-fit, adhesive, or one or more other mechanical connection. The second free-air optical interconnect 165 can be configured, for example, in a server rack or other equipment, using one or more hollow-core fibers, for alignment with a line card or other equipment once inserted in the rack.

Figure 8:
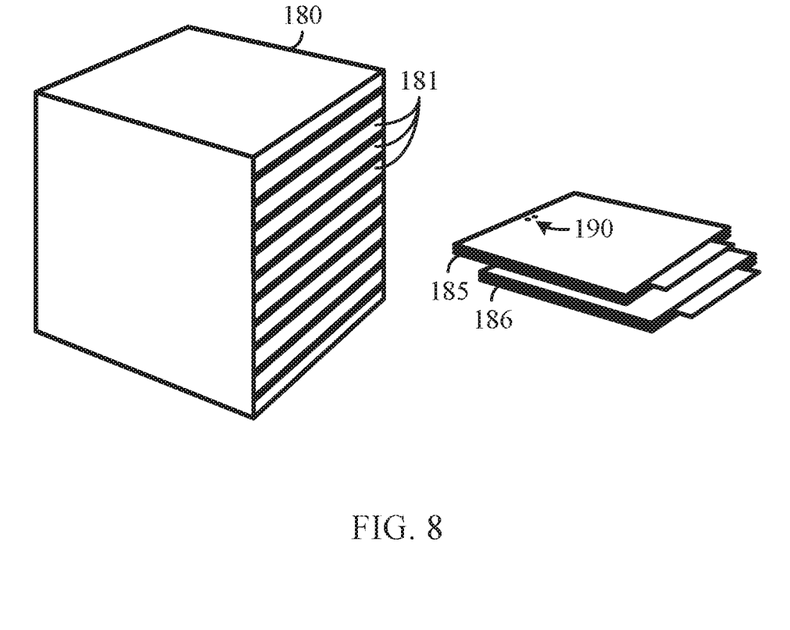
FIG. 8 is an illustration of a server rack having a plurality of slots to receive one or more stackable or rack-mounted components in accordance with some embodiments.

FIG. 8 is an illustration of a server rack 180 having a plurality of slots 181 to receive one or more stackable or rack-mounted components, such as the first or second rack-mounted components 185, 186 (e.g., a rack-mountable computer block, expander, network-attached storage (NAS), or one or more other components). In an example, one or more of the first or second rack-mounted components 185, 186 can include an optical transmitter (TX) receiver (RX) pair 190. The slots 181 of the server rack 180 can be configured to receive the first or second rack-mounted components 185, 186, and send or receive information to or from using one or more traditional or free-air optical interconnects, such as those disclosed or described herein. Such free-air optical interconnects can provide a high-efficiency, robust solution for increased equipment density, higher data transfer rates, with reduced mechanical connection wear and failure rates.

In other examples, one or more of the free-air optical interconnects disclosed herein, in addition to communicating optical signals, can be configured to provide or receive power or otherwise communicate data using one or more electrical conductors requiring direct electrical contact of physical components (e.g., using the attach mechanism or other direct electrical contact, etc.).

Figure 9:
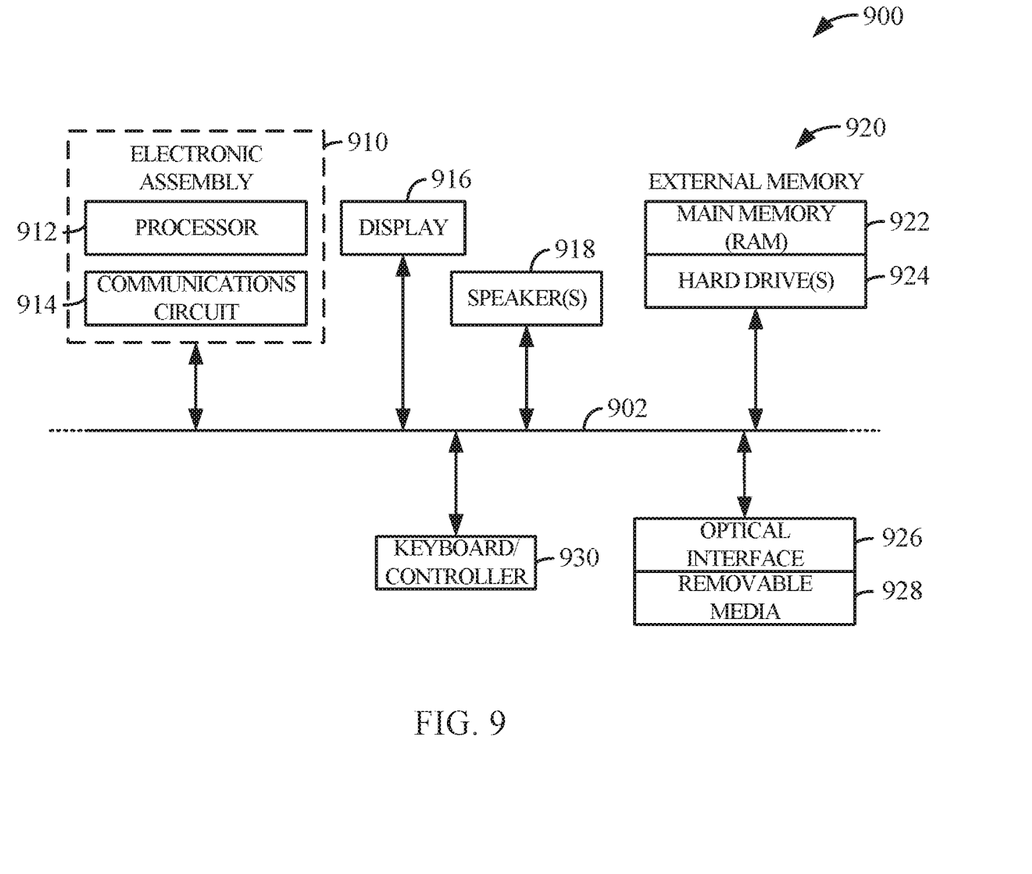
FIG. 9 is an illustration of a block diagram of an electronic system incorporating at least one electronic circuit assembly in accordance with some embodiments.

FIG. 9 is an illustration of a block diagram of an electronic system 900 incorporating at least one electronic circuit assembly in accordance with at least one embodiment of the invention. Electronic system 900 is merely one example in which embodiments of the present invention can be used. Examples of electronic systems include, but are not limited to personal computers, tablet computers, mobile telephones, game devices, compute sticks etc. In this example, electronic system 900 comprises a data processing system that includes a system bus 902 to couple the various components of the system. System bus 902 provides communications links among the various components of the electronic system 900 and can be implemented as a single bus, as a combination of busses, or in any other suitable manner.

An electronic assembly 910 can be coupled to system bus 902. The electronic assembly 910 can include any circuit or combination of circuits. In one embodiment, the electronic assembly 910 includes a processor 912 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 910 are a custom circuit, an application-specific integrated circuit (ASIC), or the like. The electronic assembly can include a communications circuit 914 for use in wireless devices like mobile telephones, personal data assistants, portable computers, two-way radios, and similar electronic systems.

The electronic system 900 can also include an external memory 920, which in turn can include one or more memory elements suitable to the particular application, such as a main memory 922 in the form of random access memory (RAM), one or more hard drives 924. The electronic assembly 910 can also include a free air optical interface 926 for removable media 928 such as compact disks (CD), flash memory cards, digital video disk (DVD), and the like.

The electronic system 900 can also include a display device 916, one or more speakers 918, and a keyboard and/or controller 930, which can include a mouse, trackball, touch screen, voice-recognition device, or any other device that permits a system user to input information into and receive information from the electronic system 900.

ADDITIONAL DESCRIPTION AND EXAMPLES

These several embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

In Example 1, a system includes a first free-air optical interconnect of a first electrical component, the first free-air optical interconnect configured to mechanically couple to a second free-air optical interconnect of a second electrical component to communicate optical signals between the first and second electrical components, the first free-air optical interconnect including an attach mechanism and a communication interface. The attach mechanism is configured to mechanically receive and couple the second free-air optical interconnect to the first free-air optical interconnect, and the communication interface is configured to facilitate communication of optical signals between the first free-air optical interconnect and the second free-air optical interconnect. When coupled, the attach mechanism is configured to retain the second free-air optical interconnect a fixed distance from the communication interface of the first free-air optical interconnect to maintain an air gap and alignment between the communication interface of the first free-air optical interconnect and a communication interface of the second free-air optical interconnect.

In Example 2, the communication interface of Example 1 optionally includes a transmitter configured to transmit laser energy, and a receiver configured to detect laser energy.

In Example 3, the transmitter of any one or more of Examples 1-2 optionally includes a laser emitter, and the receiver of any one or more of Examples 1-2 optionally includes a photodiode separate from the transmitter.

In Example 4, the communication interface of any one or more of Examples 1-3 optionally includes first and second sockets configured to receive respective hollow-core fibers, the hollow-core fibers optionally configured to communicate optical signals between the first free-air optical interconnect and the first electrical component.

In Example 5, the attach mechanism of any one or more of Examples 1-4 optionally includes a magnetic attach mechanism configured receive and magnetically retain the second free-air optical interconnect to the first free-air optical interconnect.

In Example 6, the attach mechanism of any one or more of Examples 1-5 optionally includes a conductor configured to be coupled to a magnetic attach mechanism of the second free-air optical interconnect.

In Example 7, the attach mechanism of any one or more of Examples 1-6 optionally includes an alignment feature configured to provide alignment of the first free-air optical interconnect with the second free-air optical interconnect, and a retainment feature configured to retain the second free-air optical interconnect at the first free-air optical interconnect.

In Example 8, the first free-air optical interconnect of any one or more of Examples 1-7 optionally includes an electrical interface configured communicate electrical signals between the first free-air optical interconnect and the first electrical component.

In Example 9, the first electrical component of any one or more of Examples 1-8 optionally includes a line card, and the second electrical component is a backplane mounted receptacle.

In Example 10, any one or more of Examples 1-9 optionally includes the line card, wherein the first free-air optical interconnect is optionally mounted to the line card.

In Example 11, the communication interface of any one or more of Examples 1-10 optionally includes separate electrical connectors configured to provide or receive power or to communicate data using electrical conductors.

In Example 12, a method includes mechanically receiving a second free-air optical interconnect at a first free-air optical interconnect and coupling the second free-air optical interconnect to the first free-air optical interconnect using an attach mechanism of the first free-air optical interconnect and communicating optical signals between the first free-air optical interconnect and the second free-air optical interconnect using a communication interface, wherein coupling the second free-air optical interconnect to the first free-air optical interconnect includes retaining the second free-air optical interconnect a fixed distance from the communication interface of the first free-air optical interconnect to maintain an air gap and alignment between the communication interface of the first free-air optical interconnect a communication interface of the second free-air optical interconnect.

In Example 13, the communicating optical signals of Example 12 optionally includes transmitting laser energy using a transmitter including a laser emitter, and detecting laser energy using a receiver including a photodiode separate from the transmitter.

In Example 14, the communication interface of any one or more of Examples 12-13 optionally includes first and second sockets configured to receive respective hollow-core fibers, and the method of any one or more of Examples 12-13 optionally includes communicating optical signals between the first free-air optical interconnect and the first electrical component using the hollow-core fibers.

In Example 15, the mechanically receiving the second free-air optical interconnect at a first free-air optical interconnect and coupling the second free-air optical interconnect to the first free-air optical interconnect of any one or more of Examples 12-14 optionally includes using a magnetic attach mechanism.

In Example 16, the mechanically receiving and coupling the second free-air optical interconnect to the first free-air optical interconnect of any one or more of Examples 12-15 optionally includes aligning the first free-air optical interconnect with the second free-air optical interconnect using an alignment feature, and retaining the second free-air optical interconnect at the first free-air optical interconnect using an retainment feature.

In Example 17, any one or more of Examples 12-16 optionally includes communicating electrical signals between the first free-air optical interconnect and the first electrical component using an electrical interface.

In Example 18, the first electrical component of any one or more of Examples 12-17 optionally includes a line card, and the second electrical component of any one or more of Examples 12-17 optionally includes a backplane mounted receptacle.

In Example 19, any one or more of Examples 12-18 optionally includes the line card, and the first free-air optical interconnect of any one or more of Examples 12-14 is optionally mounted to the line card.

In Example 20, any one or more of Examples 12-19 optionally includes providing or receiving power or communicating data using separate electrical connectors of the first or second free-air optical interconnect.

In Example 21, a system or apparatus can include, or can optionally be combined with any portion or combination of any portions of any one or more of Examples 1-20 to include, means for performing any one or more of the functions of Examples, 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
a first communication lane including a first free-air optical interconnect of a first electrical component, the first free-air optical interconnect configured to mechanically couple to a second free-air optical interconnect of a second electrical component to communicate optical signals between the first and second electrical components, the first free-air optical interconnect including:
a laser bandpass filter configured to reduce optical signal crosstalk from another communication lane;
an attach mechanism configured to mechanically receive and couple the second free-air optical interconnect to the first free-air optical interconnect;
a communication interface configured to facilitate communication of optical signals between the first free-air optical interconnect and the second free-air optical interconnect,
wherein, when coupled, the attach mechanism is configured to retain the second free-air optical interconnect a fixed distance from the communication interface of the first free-air optical interconnect to maintain an air gap and alignment between the communication interface of the first free-air optical interconnect and a communication interface of the second free-air optical interconnect.

2. The system of claim 1, wherein the communication interface includes:
a transmitter configured to transmit laser energy; and
a receiver configured to detect laser energy.

3. The system of claim 2, wherein the transmitter includes a laser emitter, and the receiver includes a photodiode separate from the transmitter.

4. The system of claim 1, wherein the communication interface includes first and second sockets configured to receive respective hollow-core fibers, the hollow-core fibers configured to communicate optical signals between the first free-air optical interconnect and the first electrical component.

5. The system of claim 1, wherein the attach mechanism includes a magnetic attach mechanism configured receive and magnetically retain the second free-air optical interconnect to the first free-air optical interconnect.

6. The system of claim 1, wherein the attach mechanism includes a conductor configured to be coupled to a magnetic attach mechanism of the second free-air optical interconnect.

7. The system of claim 1, wherein the attach mechanism includes:
an alignment feature configured to provide alignment of the first free-air optical interconnect with the second free-air optical interconnect; and
a retainment feature configured to retain the second free-air optical interconnect at the first free-air optical interconnect.

8. The system of claim 1, wherein the first free-air optical interconnect includes an electrical interface configured communicate electrical signals between the first free-air optical interconnect and the first electrical component.

9. The system of claim 1, wherein the first electrical component is a line card, and the second electrical component is a backplane mounted receptacle.

10. The system of claim 9, including the line card, wherein the first free-air optical interconnect is mounted to the line card.

11. The system of claim 1, wherein the communication interface includes separate electrical connectors configured to provide or receive power or to communicate data using electrical conductors.

12. A method comprising:
mechanically receiving a second free-air optical interconnect at a first free-air optical interconnect and coupling the second free-air optical interconnect to the first free-air optical interconnect using an attach mechanism of the first free-air optical interconnect; and
communicating optical signals between the first free-air optical interconnect and the second free-air optical interconnect using a first communication lane of a communication interface;
reducing crosstalk from another communication lane of the communication interface using a laser bandpass filter,
wherein coupling the second free-air optical interconnect to the first free-air optical interconnect includes retaining the second free-air optical interconnect a fixed distance from the communication interface of the first free-air optical interconnect to maintain an air gap and alignment between the communication interface of the first free-air optical interconnect a communication interface of the second free-air optical interconnect.

13. The method of claim 12, wherein communicating optical signals includes:
transmitting laser energy using a transmitter including a laser emitter; and
detecting laser energy using a receiver including a photodiode separate from the transmitter.

14. The method of claim 12, wherein the communication interface includes first and second sockets configured to receive respective hollow-core fibers, and the method includes:
communicating optical signals between the first free-air optical interconnect and the first electrical component using the hollow-core fibers.

15. The method of claim 12, wherein mechanically receiving the second free-air optical interconnect at a first free-air optical interconnect and coupling the second free-air optical interconnect to the first free-air optical interconnect includes using a magnetic attach mechanism.

16. The method of claim 12, wherein mechanically receiving and coupling the second free-air optical interconnect to the first free-air optical interconnect includes:
aligning the first free-air optical interconnect with the second free-air optical interconnect using an alignment feature; and
retaining the second free-air optical interconnect at the first free-air optical interconnect using an retainment feature.

17. The method of claim 12, including communicating electrical signals between the first free-air optical interconnect and the first electrical component using an electrical interface.

18. The method of claim 12, wherein the first electrical component is a line card, and the second electrical component is a backplane mounted receptacle.

19. The method of claim 18, including the line card, wherein the first free-air optical interconnect is mounted to the line card.

20. The method of claim 12, including providing or receiving power or communicating data using separate electrical connectors of the first or second free-air optical interconnect.

\* \* \* \* \*